United States Patent [19]
Cho

[11] 3,751,310
[45] Aug. 7, 1973

[54] GERMANIUM DOPED EPITAXIAL FILMS BY THE MOLECULAR BEAM METHOD

[75] Inventor: Alfred Yi Cho, New Providence, N.J.

[73] Assignee: Bell Telephone Laboratories, Incorporated, Murray Hill, N.J.

[22] Filed: Mar. 25, 1971

[21] Appl. No.: 127,926

[52] U.S. Cl. .................. 148/175, 23/204, 117/93.3, 117/106 A, 117/212, 117/213, 117/215, 204/192, 252/62.3 GA, 317/235 R

[51] Int. Cl. .... H01l 7/36, C01b 31/36, C23c 11/00

[58] Field of Search ............................ 148/1.5, 175; 204/192; 117/106, 212, 213, 93.3, 215; 252/62.3; 23/204; 317/235 N

[56] References Cited

UNITED STATES PATENTS

| | | | |
|---|---|---|---|
| 3,615,931 | 10/1971 | Arthur | 148/175 |
| 3,266,952 | 8/1966 | McCaldin | 148/33 |
| 3,387,163 | 6/1968 | Queisser | 317/235 N |
| 3,484,713 | 12/1969 | Fenner | 317/235 N |
| 3,560,275 | 2/1971 | Kressel et al. | 148/171 |

OTHER PUBLICATIONS

Thurmond, C. D., "Phase Equilibria in the GaAs and GaP Systems" J. Phys. Chem. Solids, Vol. 26, 1965, pp. 785–802.

Queisser, H. J., "Photoluminescence of Silicon–Compensated Gallium Arsenide" J. Applied Physics, Vol. 37, No. 7, June 1966, pp. 2909–2910.

Arthur et al., "GaAs, GaP, and $GaAs_xP_{1-x}$ Epitaxial . . . Deposition" J. of Vacuum Science and Tech., Vol. 6, July–Aug., 1969, pp. 545–548.

*Primary Examiner*—L. Dewayne Rutledge
*Assistant Examiner*—W. G. Saba
*Attorney*—W. L. Keefauver and Arthur J. Torsiglieri

[57] ABSTRACT

Single crystal thin films of Group III(a)–V(a) compounds grown by the molecular beam epitaxy method are doped during growth with germanium. Generally, the Group IV dopants such as tin and silicon produce n-type crystals. However, germanium produces either n-type or p-type crystals depending on whether the growth surface structure is stabilized in the Group V(a) element or the Group III(a) elements, respectively, which in turn depends on both the substrate temperature and the ratio of the Group V(a) element to Group III(a) elements in the molecular beam.

11 Claims, 3 Drawing Figures

INVENTOR
A. Y. CHO
BY Michael J. Urbano
ATTORNEY

GERMANIUM DOPED EPITAXIAL FILMS BY THE MOLECULAR BEAM METHOD

BACKGROUND OF THE INVENTION

This invention relates to the epitaxial growth of thin films of Group III(a)–V(a) compounds and mixed crystals thereof and, more particularly, to the doping of such films during growth by the molecular beam epitaxy (MBE) method.

In copending application Ser. No. 787,470 (J. R. Arthur, Jr. Case 3) filed on December 27, 1968 and assigned to the assignee hereof now U.S. Pat. No. 3,615,931 issued on Oct. 26, 1971). there is described a nonequilibrium epitaxial technique for the growth of Group III(a)–V(a) thin films in which a first molecular beam (or beams) of the constituent components of the desired film are directed onto a substrate preheated to a temperature within the range of about 450°–650° Centigrade and maintained at subatmospheric pressure. This technique, termed molecular beam epitaxy (MBE), permits the controlled growth of films of a wide range of thicknesses and is especially applicable to films less than one micron thick.

In the fabrication of such thin films for use in semiconductor devices, e.g., p-n junction lasers, it is desirable to be able to control the conductivity type of the film being grown. To this end a separate source containing an appropriate element is generally utilized to produce, when heated, another molecular beam which impinges on the substrate simultaneously with the first beam.

I have found, however, that the determination of an appropriate dopant for use in MBE involves more than simply relying on prior semiconductor technology which typically employs Group II elements as p-type dopants and Group VI elements as n-type dopants.

More specifically, the Group II elements with reasonable solubilities have high vapor pressures and low sticking coefficients at epitaxial temperatures, and therefore may not adhere to the substrate. In fact, zinc, the most likely candidate, has a low sticking coefficient and its presence in a GaAs film could not be detected by photoluminescence when Zn arrival rates were in a convenient working range. Furthermore, some of the Group II elements, namely, the Group II(a) elements (Be, Mg, Ca, Ba), are so reactive that a pure dopant beam and hence controlled doping of the grown film is difficult to achieve. The Group VI elements present similar problems. Oxygen, sulfur and tellurium may have too high a vapor pressure to dope GaAs and GaP at convenient arrival rates.

It is, therefore, an object of my invention to control the conductivity type of Group III(a)–V(a) epitaxial films during growth by the MBE technique.

SUMMARY OF THE INVENTION

This and other objects are accomplished in accordance with an illustrative embodiment of my invention, an MBE technique for the growth of epitaxial thin films of Group III(a)–V(a) compounds, and mixed crystals thereof, in which a separate source containing an amphoteric dopant i.e., germanium is heated to produce a molecular beam for doping the thin film. Epitaxial films result when grown on a substrate preheated, at subatmospheric pressures, to a temperature effective to allow atoms impinging thereon to migrate to surface sites to form the epitaxial film and effective to produce congruent evaporation, hereinafter defined, of the Group III(a) element and the Group V(a) element. Typically the substrate temperature ranges from 450°–650° Centigrade.

I have found that a tin dopant source produces n-type single crystals whereas a silicon dopant source produces either n-type or compensated crystals. On the other hand, a germanium source has the surprising property that it can produce either an n-type or a p-type crystal depending on whether the substrate surface structure is stabilized in the Group V(a) element or the Group III(a) elements. The latter characteristic is a function of two parameters (1) the substrate temperature and (2) the ratio of the Group V(a) to Group III(a) elements in the molecular beam. Thus, by controlling these two parameters it is possible to use a single dopant source to produce both n-type and p-type conductivity in alternate contiguous layers without requiring system shut-down. This feature of my invention is particularly useful in the fabrication of multilayered semiconductor devices having alternating p- and n-type layers such as the double heterostructure (DH) injection lasers described in copending application Ser. No. 33,705 (I. Hayashi Case 4) filed on May 1, 1970. Moreover, extremely thin layers of controlled thickness can be grown by the MBE technique, an important consideration in the formation of the thin (e.g., 0.5 microns) active region of the DH laser diode.

BRIEF DESCRIPTION OF THE DRAWING

These and other objects of the invention, together with its various features and advantages, can be easily understood from the following more detailed description taken in conjunction with the accompanying drawing in which.

DETAILED DESCRIPTION

APPARATUS

Figure 1:
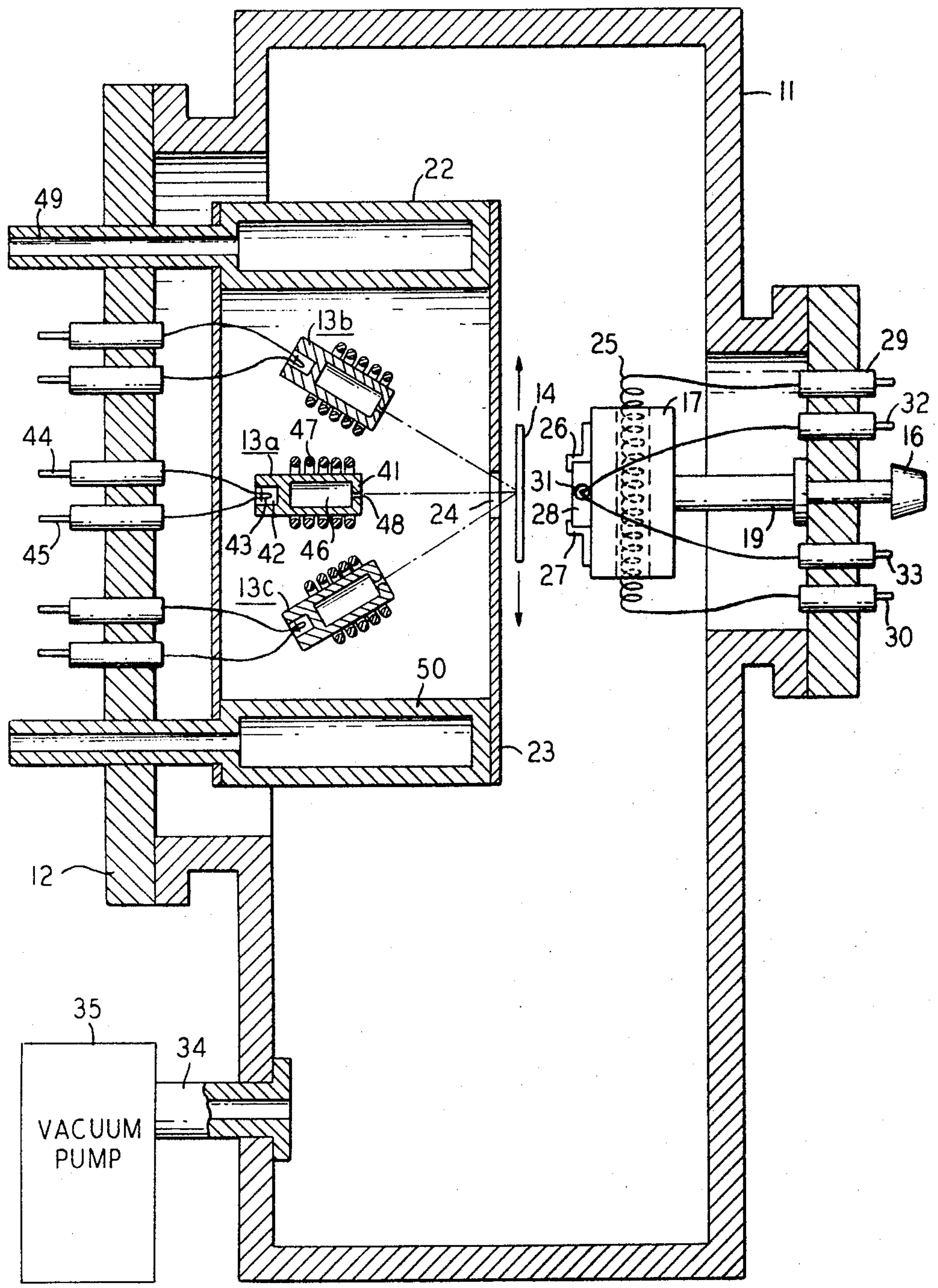
FIG. 1 is a partial schematic-partial cross-sectional view of apparatus for practicing my invention.

Turning now to FIG. 1, there is shown apparatus in accordance with my invention for growing epitaxial films of Group III(a)–V(a) compounds, and mixed crystals thereof, of controllable thickness on a substrate by molecular beam epitaxy.

The apparatus comprises a vacuum cahmber 11 having disposed therein a gun port 12 containing illustratively three cylindrical guns 13*a*, 13*b* and 13*c*, typically Knudsen cells, and a substrate holder 17, typically a molydenum block. Holder 17 is adapted for rotary motion by means of shaft 19 having a control knob 16 located exterior to chamber 11. Also shown disposed within chamber 11 is a cylindrical liquid nitrogen cooling shroud 22 which surrounds the guns and a collimating frame 23 having a collimating aperture 24. A movable shutter 14 is disposed in front of aperture 24. Substrate holder 17 is provided with an internal heater 25 and with clips 26 and 27 for affixing a substrate member 28 thereto. Additionally, a thermocouple is disposed in aperture 31 in the side of substrate 28 and is coupled externally via connectors 32–33 in order to sense the temperature of substrate 28. Chamber 11 also includes an outlet 34 for evacuating the chamber by means of a pump 35.

A typical cylindrical gun 13*a* comprises a refractory crucible 41 having a source chamber 46, a thermocouple well 42 and a thermocouple 43 inserted in well 42 for the purpose of determining the temperature of source material contained in chamber 46. Thermocouple 43 is connected to an external detector (not shown) via connectors 44–45. Source material (e.g., bulk GaAs) is inserted in chamber 46 for evaporation by heating coil 47 which surrounds the crucible. The end of crucible 41 adjacent aperture 24 is provided with a knife-edge opening 48 (typically about 0.17cm$^2$) of diameter preferably less than the average mean free path of atoms in the source chamber.

General Technique

The first step in an illustrative embodiment of the inventive technique involves selecting a single crystal substrate member, such as GaAs, which may readily be obtained from commercial sources. One major surface of the GaAs substrate member is initially cut along the (001) plane and polished with diamond paste, or any other conventional technique, for the purpose of removing the surface damage therefrom. An etchant such as a bromine-methanol or hydrogen peroxide-sulphuric acid solution may optionally be employed for the purpose of further purifying the substrate surface subsequent to polishing.

Next, the substrate is placed in an apparatus of the type shown in FIG. 1, and thereafter, the background pressure in the vacuum chamber is reduced to less than $10^{-6}$ torr and preferably to a value of the order of $10^{-9}$ to $10^{-10}$ torr, thereby precluding the introduction of any deleterious components onto the substrate surface. Since, however, the substrate surface may be subject to atmospheric contamination before being mounted into the vacuum chamber, the substrate is preferably heated, e.g., to about 600° Centigrade, to provide an atomically clean growth surface, (i.e., desorption of contaminants such as CO and $H_2O$). The next steps in the process involve introducing liquid nitrogen into the cooling shroud via entrance port 49 and heating the substrate member to the growth temperature which typically ranges from 450°–650° Centigrade dependent upon the specific material to be grown, such range being dictated by considerations relating to arrival rates and surface diffusion.

The guns 13*a*, 13*b* and 13*c* employed in the system, have previously been filled with the requisite amounts of the consituents of the desired film to be grown (e.g., gun 13a contains a Group III(a)–V(a) compound such as a GaAs in bulk form; gun 13*b* contains a Group III(a) element such as Ga; and gun 13*c* contains an amphoteric dopant such as Ge in bulk form). Following, each gun is heated to a temperature (not necessarily all the same) typically ranging from 730°–1000° Centigrade sufficient to vaporize the contents thereof to yield (with shutter 14 open) a molecular beam (or beams); that is, a stream of atoms manifesting velocity components in the same direction, in this case toward the substrate surface. The atoms or molecules reflected from the surface strike the interior surface 50 of the cooled shroud 22 and are condensed, thereby insuring that only atoms or molecules from the molecular beam impinge upon the surface.

For the purposes of the present invention, the amount of source materials (e.g., GaP or GaAs) furnished to the guns should be sufficient to provide an excess of $P_2$ or $As_2$ with respect to Ga. This condition arises from the large differences in sticking (i.e., condensation) coefficient of the several materials; namely, unity for Ga and $10^{-2}$ for $P_2$ on GaP surface, the latter increasing to unity when there is an excess of Ga on the surface. Therefore, as long as the $P_2$ arrival rate is higher than that of Ga, the growth will be stoichiometric. Similar considerations apply to Ga and As.

Growth of the desired doped epitaxial film is effected by directing the molecular beam generated by the guns at the collimating frame 23 which functions to remove velocity components therein in directions other than those desired, thereby permitting the desired beam to pass through the collimating aperture 24 to effect reaction at the substrate surface. Growth is continued for a time period sufficient to yield an epitaxial film of the desired thickness. This technique permits the controlled growth of films of thickness ranging from a single monolayer (about 3 Angstroms) to more than 20,000 Angstroms. Note, however, that collimating frame four the molecular beams serves primarily to keep the vacuum system clean and is not essential to the growth technique.

The reasons which dictate the use of the aforementioned temperature ranges can be understood as follows. It is now known that Group III(a)–V(a) elements contained in compound semiconductors are adsorbed upon the surface of single crystal semiconductors at varying rates, the V(a) elements typically being almost entirely reflected therefrom in the absence of III(a) elements. However, the growth of stoichiometric III(a)–V(a) semiconductor compounds may be effected by providing vapors of Group III(a) and V(a) elements at the substrate surface, an excess of Group V(a) element being present with respect to the III(a) elements, thereby assuring that the entirety of the III(a) elements will be consumed while the nonreacted V(a) excess is reflected. In this connection, the aforementioned substrate temperature range is related to the arrival rate and surface mobility of atoms striking the surface, i.e., the surface temperature must be high enough (e.g., greater than 450° Centigrade) that impinging atoms have enough thermal energy to be able to migrate to favorable surface sites (potential wells) to form the epitaxial layer. The higher the arrival rate of these impinging atoms, the higher must be the substrate temperature. On the other hand, the substrate surface temperature should not be so high (e.g., greater than 650° Centigrade) that noncongruent evaporation results. As defined by C. D. Thurmond in *Journal of Physics Chem. Solids*, 26, 785 (1965), noncongruent evaporation is the preferential evaporation of the V(a) element from the substrate having eventually only the III(a) element. Generally, therefore congruent evaporation means that the evaporation rate of the III(a) and V(a) elements are equal. Similarly, the cell temperature must be high enough (>730° Centigrade) to produce appreciable evaporation and yet not so high (<1000° Centigrade) that the higher arrival rate of the V(a) element will result in most of the V(a) element being reflected from the surface before being trapped there by the III(a) element.

SURFACE STRUCTURE TRANSITIONS

Before discussing examples of doping Group III(a-)–V(a) compounds with amphoteric dopants by MBE, in particular Ge doped GaAs, it will be helpful to consider the transition of the (001) surface structure of GaAs as a function of two parameters: (1) the substrate temperature and (2) the $As_2$/Ga intensity ratio in the molecular beam. While other GaAs faces such as $(\bar{1}\bar{1}\bar{1})$, also exhibit reversible transitions of the surface structures, the (001) surface is of particular interest because it is possible to have two pairs of cleavage planes perpendicular to the (001) plane, a desirable property for injection lasers of the Fabry-Perot geometry and for some phase modulation devices.

In the following discussion the conventions described by E. A. Wood in *Journal of Applied Physics*, 35, 1306 (1964) will be used to describe the surface structures. Thus, GaAs (001)–C(*mxn*) means that the GaAs crystal oriented with [001] direction normal to the surface has a surface structure mxn larger than the underlying bulk structure and it is centered. The surface structures were observed with a well-known high energy electron diffraction (HEED) system in which the diffraction pattern is only a cross-section of the reciprocal lattice in a particular azimuth according to the incidence direction of the high energy electron beam. The surface structure observed on a particular azimuth in the HEED pattern when described hereinafter as ½- or ¼-integral order in the [*hkl*] direction means that the Ewald sphere intersects the reciprocal scattering centers having ½ or ¼ the spacings of the bulk diffraction at zeroth Laue zone.

Figure 2:
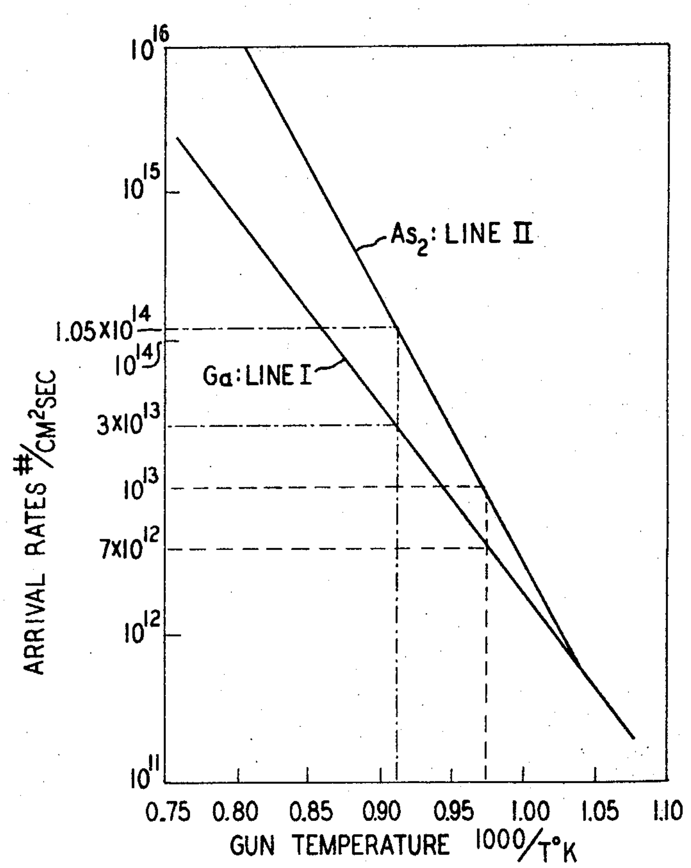
FIG. 2 is a graph of the arrival rates of Ga and $As_2$ as a function of oven (cell) temperature.

The GaAs surface structures were continuously observed in HEED during deposition with the electron beam along the $[\bar{1}\bar{1}0]$ azimuth. Two separate experiments were done in the studies of the dependence of surface structure on deposition rates. The first was to evaporate GaAs from a single gun filled with polycrystalline GaAs. The arrival rates of Ga and $As_2$ as a function of the gun temperature, as shown in FIG. 2, were calculated from the vapor pressure data given in an article by J. R. Arthur, Jr., in *J. Phys. Chem. Solids*, Vol. 28, 2257 (1967). Notice that the $As_2$ to Ga ratio increases along with the beam intensities as the gun temperature is increased. The second experiment included an additional gallium or arsenic source with the GaAs gun so that the ratio of $As_2$/Ga could be varied independently.

Figure 3:
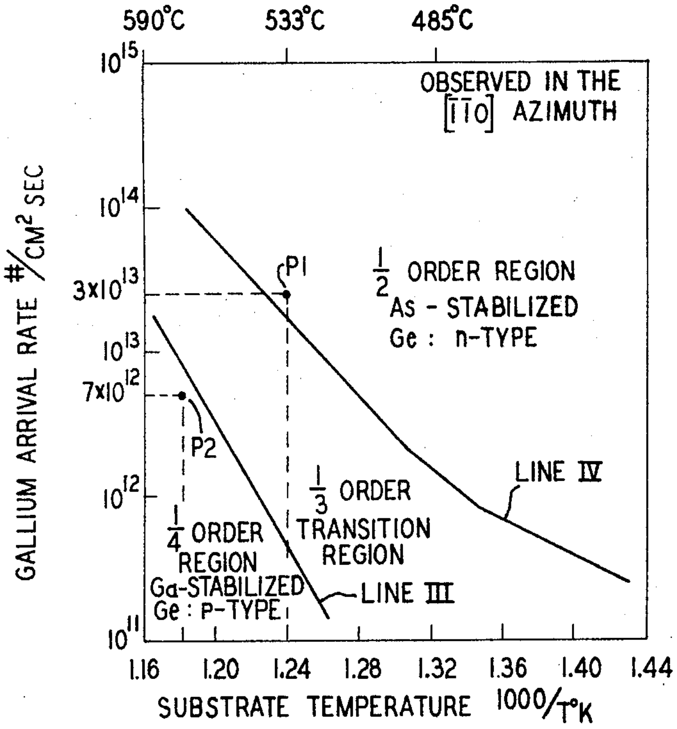
FIG. 3 is a graph showing the transition of the surface structure as a function of the Ga arrival rates and the substrate temperatures.

FIG. 3 shows the transitions of the diffraction patterns in the $[\bar{1}\bar{1}0]$ azimuth from ½-integral orders to diffused ⅛-integral orders and to ¼-integral orders as a function of the deposition rate and the substrate temperature. These transitions are plotted as a function of the Ga arrival rate where the corresponding $As_2$ arrival rate can be found in FIG. 2. For a fixed substrate temperature, higher deposition rate from a single GaAs effusion oven (gun) produced a ½ order in the $[\bar{1}\bar{1}0]$ direction. As the deposition rate decreased the diffraction changed to ¼ order. If the deposition rate was held constant, an increase in substrate temperature could also cause the transition to ¼ order. The diffused ⅛ order observed in the transition probably resulted from a mixture of ½ and ¼ orders. Hysteresis of the transition as the substrate temperature was varied has been omitted for simplicity from FIG. 3. When the gun temperature was lowered to give a ratio of $As_2$ to Ga equal to unity in the molecular beam, the transition temperature diverged from a straight line (FIG. 3). There was also a 1/6 order observed when the substrate was cooled with very low ($3\times10^{11}$ Ga/cm$^2$ sec and $3\times10^{11}$ $As_2$/cm$^2$ sec) arrival rates.

While the diffraction pattern was changing from ½ order to ¼ order in the $[\bar{1}\bar{1}0]$ azimuth, the pattern changed from ¼ to ½ order in the [110] azimuth. The surface structures of GaAs (001)–C(2×8) and GaAs (001)–C(8×2) were related by a simple rotation of 90° about the [001] direction. This can be explained by the proposed model that one of these patterns corresponds to an arsenic surface and the other to a gallium surface. The (001) planes of GaAs are alternate layers of Ga and As. The directions of the dangling bonds of these two layers are rotated 90° about the [001] axis. The reconstructed surface structures resulted from the surface atoms being pulled together in the direction of their dangling bonds. The decrease in GaAs gun temperature or the increase in the substrate temperature caused the rotation of the surface structure because a decrease in gun temperature resulted in lowering the $As_2$/Ga ratio in the molecular beam and an increase in substrate temperature decreased the sticking coefficient of As.

The results of the second experiment with separate Ga and $As_2$ ovens, where the ratios of $As_2$/Ga could be varied independently, showed that an arsenic stabilized (001)–C(2×8) surface structure rotated 90° about the [001] axis when the gallium arrival rate was increased. A reversed rotation was observed with an increase in the arsenic intensity while growing a gallium stabilized (001)–C(8×2) structure. The arrival rates of $As_2$ and Ga causing the transitions are tabulated in Table I below:

TABLE I

| Substrate Temperature 570° C | Arrival Rates lb./cm² sec Ga | $As_2$ | Two Dimensional Surface Structure |
|---|---|---|---|
| Increasing | $1\times10^{14}$ | $1\times10^{15}$ | As-stabilized (001)-C(2×8) |
| Ga Arrival Rate | $3\times10^{14}$ | $1\times10^{15}$ | Ga-stabilized (001)-C(8×2) |
| Increasing | $6\times10^{12}$ | $1.5\times10^{13}$ | Ga-stabilized (001)-C(8×2) |
| $As_2$ Arrival Rate | $6\times10^{12}$ | $1\times10^{14}$ | As-stabilized (001)-C(2×8) |

One method of determining whether the surface structure is a Ga-stabilized or an As-stabilized surface structure is the following. If the structure is As-stabilized, when the shutter is closed to stop the molecular beam, the surface structure will rotate 90° about the [001] axis, but there will be no change in the case of a Ga-stabilized surface structure because a heated GaAs surface will preferentially lose the surface layer of As atoms even though it is in the temperature range at which the equilibrium pressures are expected to yield congruent vaporization.

Summary of the Use of FIG. 2 and 3

As mentioned previously, Ge is incorporated into the GaAs film as either an n-type or p-type dopant depending on whether the growth surface structure is stabilized in As or Ga, respectively. In FIG. 3, operating points above line IV produce As-stabilized surface structures whereas operating points below line III produce Ga-stabilized surface structures. The region of operating points between lines III and IV corresponds to transition structures between those which are Ga- and As-stabilized, ignoring for simplicity hysteresis effects which affect the extent of the transition region between these two lines.

Thus, to grow a p-type, Ge-doped GaAs film, assuming a substrate temperature of about 805° Kelvin (1000/1.24) one chooses an operating point such as P1 above (or on) line IV. P1 corresponds to a Ga arrival rate of about $3\times10^{13}/cm^2$ sec. Using the latter parameter, one now enters FIG. 2 and determines a gun temperature of about 1100 degrees Kelvin (1000/0.91) which from line II corresponds to an $As_2$ arrival rate of about $1.05\times10^{14}/cm^2$ sec. Thus, for a substrate temperature of about 805° Kelvin, the $As_2$/Ga ratio in the molecular beam should be about $1.05\times10^{14}/3\times10^{13}$ or about 3.5:1. Of course, the ratio condition may be satisfied either by a single gun containing GaAs heated to about 1100° Kelvin or separate GaAs and Ga guns heated to temperatures such that the combined beams from the two guns produce the desired ratio, a calculation well within the scope of those skilled in the art.

In a similar fashion, the appropriate $As_2$/Ga ratio for p-type growth of Ge-doped GaAs can be determined. For example, one chooses operating point such as P2 below (or on) line III of FIG. 3. Following the same procedure as immediately above, it can be shown that P2 corresponds to an $As_2$/Ga ratio of about $10^{13}/7\times10^{12}$ or about 1.43:1 for a substrate temperature of about 845° Kelvin (1000/1.18) and a single GaAs gun temperature of about 1030° Kelvin (1000/0.97). Again, more than one gun may be used with appropriately adjusted temperatures.

The following examples of my invention are given by way of illustration and are not to be construed as limitations, many variations being possible within the spirit and scope of the invention.

EXAMPLE I

This example describes a process for the growth on a gallium arsenide substrate of an epitaxial film of gallium arsenide doped n-type with germanium.

A gallium arsenide substrate member evidencing few dislocations, obtained from commercial sources, was cut along the (001) plane to dimensions of about 1.25cm × 0.6cm × 0.125cm and was initially polished with diamond paste by conventional mechanical polishing techniques and then etched with bromine-methanol. The substrate was then mounted on a molybdenum heating block and inserted in an apaparatus of the type shown in FIG. 1 at a distance of about 5.5cm from the aperture 24. In the apparatus actually employed, three guns were contained in the gun port, one gram of gallium arsenide, one-half gram of gallium and one-half gram of germanium being placed in the respective guns 13*a*–13*c*. Following, the vacuum chamber was evacuated to a pressure of the order of $10^{-7}$ torr and the substrate was heated to 600° Centigrade to provide an atomically clean growth surface. Following, liquid nitrogen was introduced to the cooling shroud and the guns heated, the gallium arsenide gun to a temperature of about 1250° Kelvin and the gallium gun to about 1300° Kelvin (as measured by 5 percent versus 26 percent W-Re thermocouples 43 calibrated with an optical pyrometer), thereby resulting in vaporization of the materials contained therein and the consequent flow of molecular beams toward the collimating frame which removed velocity components in the beams which were undesirable. These gun temperatures produced a Ga arrival rate of about $2\times10^{15}/cm^2$ sec and an $As_2$ arrival rate of about $4.5\times10^{16}/cm^2$ sec at the substrate surface. This intensity ratio of $As_2$/Ga in the molecular beams produced an As-stabilized surface structure when the substrate temperature was 815° Kelvin (as measured by a chromal-alumel thermocouple imbedded in a 10 mil aperture 31). The beams were focused upon substrate surface for a period of one-half hour, so resulting in the growth of an n-type epitaxial film of gallium arsenide upon the substrate one micron in thickness. Conductivity type was determined by well-known photoluminescent, Schottky barrier diode and thermoelectric power (hot-probe) measurements. For Ge gun temperatures ranging between about 1000° Kelvin and 1150° Kelvin the doping concentration ranged from about $10^{16}/cm^3$ to $5\times10^{18}/cm^3$. A typical doping profile measured by a well-known Copeland profiler shows that this technique produces a substantially constant doping profile as a function of depth, as well as highly abrupt junctions or controlled graded junctions, as desired.

EXAMPLE II

Following the procedure of Example I, a p-type GaAs layer doped with Ge by the MBE method was fabricated by directing a Ge molecular beam onto a GaAs substrate while growing GaAs with a Ga-stabilized surface structure. In particular the substrate temperature was maintained at about 815° Kelvin and the GaAs effusion gun at about 1180° Kelvin to give a Ga arrival rate of about $3.7\times10^{14}/cm^2$ sec and an $As_2$ arrival rate of about $4.7\times10^{15}/cm^2$ sec. The separate Ga gun, used to effect a Ga-stabilized surface structure, was heated to about 1280° Kelvin giving a Ga arrival rate of about $4\times10^{15}/cm^2$ sec at the substrate. With these combined GaAs and Ga effusion guns, the ratio of $As_2$/Ga is almost unity. The Ge gun was heated between 1000° Kelvin and 1150° Kelvin for various doping concentrations ranging between about $10^{16}/cm^3$ and $5\times10^{18}/cm^3$. Photo-luminescence from the p-type GaAs layers grown under this condition gave spectra similar to those from the n-type layers.

EXAMPLES I AND II: SUMMARY

I have successfully grown n- and p-type GaAs layers doped with Ge alone under two surface structure conditions by the molecular beam epitaxy method. For a constant substrate temperature, high $As_2$-to-Ga ratio in the molecular beam produces an As-stabilized surface structure whereas low $As_2$-to-Ga ratio produces a Ga-stabilized surface structure. Also, for a constant $As_2$-to-Ga ratio in the molecular beam, a higher substrate temperature produces a Ga-stabilized surface structure whereas a lower substrate temperature produces an As-stabilized surface structure. Germanium incorporates into the layer as an n-type dopant under As-stabilized conditions and as a p-type dopant under Ga-stabilized conditions.

EXAMPLE III

Following the procedure and parameters of Example II, p-type, Ge-doped $Al_xGa_{1-x}As$ was grown using a fourth gun filled with substantially pure Al heated to a temperature of 1350° Kelvin to yield an Al arrival rate of about $5.5\times10^{14}/cm^2$ sec at the surface of a GaAs substrate and an $x$ of about 0.1. Doping concentrations were slightly less than those of Example II.

EXAMPLE IV

Following the procedure and parameters of Example I, n-type, Ge-doped $Al_xGa_{1-x}As$ was grown with an $x$ of about 0.1 using, as in Example III, a fourth gun filled with substantially pure Al heated to a temperature of 1350° Kelvin to yield an Al arrival rate of about $5.5\times10^{14}/cm^2$ sec and doping concentrations slightly less than those of Example I.

EXAMPLE V

Following the procedure of the preceding examples, one gun was filled with about one gram of polycrystalline GaAs and another with about 0.25 gram of pure Si. The GaAs gun was heated to about 1212° Kelvin to give a Ga arrival rate of about $9\times10^{14}/cm^2$ sec and an $As_2$ arrival rate of about $1.8\times10^{16}/cm^2$ sec at the GaAs substrate. The Si gun was heated between about 1145° Kelvin and 1420° Kelvin to produce arrival rates ranging between about $3\times10^8/cm^2$ sec and $9\times10^{11}/cm^2$ sec. Doping profile measurements, made by both the Copeland method and the Schottky barrier diode method, indicated that the epitaxial GaAs films grown were doped with Si concentrations ranging from about $1\times10^{16}/cm^3$ to $5\times10^{18}/cm^3$ and further indicated only n-type conductivity (or compensated crystals) in the growth temperature range from 450° Centigrade to 580° Centigrade regardless of the surface structure of the film.

EXAMPLE VI

Following the procedure of Example V, one gun was filled with one gram of polycrystalline GaAs, another with one gram of pure Ga and the last with one gram of Sn. The GaAs gun was heated to about 1212° Kelvin to give a Ga arrival rate of about $9\times10^{14}/cm^2$ sec and an $As_2$ arrival rate of about $1.8\times10^{16}/cm^2$ sec, the Ga gun was heated to about 1200° Kelvin to give an additional Ga arrival rate of about $6\times10^{14}/cm^2$ sec and the Sn gun heated to give an Sn arrival rate of about $4.8\times10^{11}/cm^2$ sec. With the GaAs substrate heated to 560° Centigrade the resulting GaAs film had an n-type conductivity and a doping concentration of $5\times10^{18}/cm^3$, By varying the above parameters, GaAs epitaxial films were grown with Sn concentrations ranging from about $10^{17}/cm^3$ to $2\times10^{19}/cm^3$. Photoluminescent efficiency was particularly good for crystals with Sn concentrations greater than about $5\times10^{18}/cm^3$.

Room temperature mobilities of GaAs films doped with Sn concentrations of about $2\times10^{17}/cm^3$, $5\times10^{18}/cm^3$ and $2\times10^{19}/cm^3$ were about $2700cm^2/v$ sec, $1450cm^2/v$ sec and $1100cm^2/v$ sec, respectively.

In addition, it was found that Sn was incorporated into the GaAs films as a donor impurity (n-type) with either a Ga-stabilized surface structure or an As-stabilized surface structure in contrast again with the situation for Ge described in Examples I and II.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, my invention can be readily practiced to grow epitaxially other doped Group III(a)–V(a) thin films, such as GaP for which a typical growth temperature is about 500° Centigrade.

Moreover, my technique when using Ge is especially applicable to the growth of alternately doped n-type and p-type layers (such as those of a double heterostructure laser diode) in a closed system without requiring system shut-down to change conductivity type between successive layers and without requiring separate sources for an n-type and p-type dopant. In addition, the layers can also be made alternately narrow band gap and wide band gap by the use of mixed crystals such as $Ga_xAl_{1-x}As$, $x$ being controlled by the Al arrival rate.

What is claimed is:

1. A method for the epitaxial growth upon a semiconductor surface of a thin film of a material having a composition $A_xB_{1-x}C$, where $0 < x < 1$, A is a first Group III(a) element, B is a second Group III(a) element and C is a Group V(a) element, said Group III and Group V elements being selected from the groups consisting of aluminum, gallium and indium, and phosphorus, arsenic and antimony, respectively, comprising the steps of reducing the background pressure to a subatmospheric pressure, directing at least one molecular beam comprising a dopant, at least one Group III(a) element and a Group V(a) element upon said substrate surface for a time period sufficient to effect growth of a film of said material of the desired thickness, said substrate surface being preheated to a temperature effective to allow atoms impinging thereon to migrate to surface sites to form said epitaxial film and effective to produce congruent evaporation of said at least one Group III(a) element and said Group V(a) element therefrom, and characterized in that:

said dopant comprises Ge, the temperature of said surface and the ratio of said Group V(a) element to said at least one Group III(a) element in said at least one beam are mutually adapted to produce on said surface a molecular structure stabilized with respect to said Group V(a) element when it is desired that germanium incorporate into said thin film as an n-type dopant, and adapted to produce on said surface a molecular structure stabilized with respect to said at least one Group III(a) element when it is desired that germanium incorporate into said thin film as a p-type dopant.

2. The method of claim 1 wherein the material of said thin film is selected from the group consisting of $Ga_xAl_{1-x}As$, $0 < x < 1$, and GaP and said substrate surface is preheated to a temperature in the range of about 450°–650° Centigrade.

3. The method of claim 2 wherein said material comprises $Ga_xAl_{1-x}As$ , $0 < x < 1$, and said substrate comprises single crystal GaAs.

4. The method of claim 3 wherein said surface is stabilized with respect to As to produce a thin film of n-$Ga_xAl_{1-x}$ As and is stabilized with respect to $Ga_x$ and $Al_{1-x}$ when it is desired to produce a thin film of p-$Ga_xAl_{1-x}As$.

5. A method for the successive epitaxial growth upon a semiconductor surface of at least two thin films of different conductivity type of a material having a composition $A_{1-x}B_xC$ where $0 \leq x \leq 1$, A is a first Group III(a) element, B is a second Group III(a) element and C is a Group V(a) element, said Group III and Group V elements being selected from the group consisting of aluminum, gallium and indium, and phosphorus, arsenic and antimony, respectively, comprising the steps of reducing the background pressure to a subatmospheric pressure, directing at least one molecular beam comprising a dopant, at least one Group III(a) element and a Group V(a) element upon said substrate surface for a time period sufficient to effect growth of said thin films each of a desired thickness, said substrate surface being preheated to a temperature effective to allow atoms impinging thereon to migrate to surface sites to form said epitaxial film and effective to produce congruent evaporation of said at least one Group III(a) element and said Group V(a) element therefrom, and characterized in that:

said dopant comprises Ge, the temperature of said substrate and the ratio of said Group V(a) element to said at least one Group III(a) element in said at least one beam are mutually adapted to produce on said surface a molecular structure stabilized with respect to said Group V(a) element when it is desired that germanium incorporate into one of said thin films as an n-type dopant, and adapted to produce on said surface a molecular structure stabilized with respect to said at least one Group III(a) element when it is desired that germanium incorporate into another of said thin films as a p-type dopant.

6. The method of claim 5 wherein said material comprises $Ga_{1-x}Al_xAs$, $0 \leq x \leq 1$, and said substrate is preheated to a temperature in the range of about 450°–650° Centigrade.

7. The method of claim 6 wherein said substrate comprises single crystal GaAs.

8. The method of claim 5 including the step of controlling the arrival rate of said Group III(a) elements so that said at least two thin films have different band gaps.

9. The method of claim 8 wherein said material comprises $Ga_{1-x}Al_xAs$, $0 \leq x \leq 1$, and said substrate is preheated to a temperature within the range of about 450°–650° degrees Centigrade.

10. The method of claim 9 for growing on a single crystal GaAs substrate successive thin films comprising growing an n-type layer of $Ga_{1-x}Al_xAs$, $0<x<1$, growing a p-type layer of $Ga_{1-y}Al_yAs$, $0 \leq y<1$, $y<x$, and growing a p-type layer of $Ga_{1-z}Al_zAs$, $0<z<1$, $z>y$.

11. The method of claim 9 for growing on a single crystal GaAs substrate successive thin films comprising growing a p-type layer of $Ga_{1-x}Al_xAs$, $0<x<1$, growing an n-type layer of $Ga_{1-y}Al_yAs$, $0 \leq y<1$, $y<x$, and growing an n-type layer of $Ga_{1-z}Al_zAs$, $0<z<1$, $z>y$.

* * * * *